April 30, 1946.   V. D. DESMOND   2,399,333
TOY
Filed May 6, 1944

INVENTOR
Virginia D. Desmond
BY Barlow & Barlow
ATTORNEYS ns operating
UNITED STATES PATENT OFFICE 2,399,333

TOY

Virginia D. Desmond, Wrentham, Mass., assignor to Pilgrim Plastics, Inc., a corporation of Rhode Island Application May 6, 1944, Serial No. 534,413

1 Claim. (Cl. 46—193)

This invention relates to a toy of the type more particularly formed of some plastic material with a handle attached thereto.

In the formation of toys of the type having an enlarged body and a handle attached thereto, considerable difficulty has been experienced in the attaching of a handle to the body, especially is this true where the parts are formed of plastic material of the character formed by injection molding. Frequently a handle is so cupped that the enlarged body engages only the very outer edge of the cup and such cement as is used for the attaching of such a handle in position engages over only a very small portion of the two surfaces which it is desired should be attached together and the bond is weak.

One of the objects of this invention is to provide a more secure attachment of a handle to an enlarged body.

Another object of this invention is to provide an arrangement for readily, quickly and securely attaching a handle formed by an injection mold to a plastic body that the two may be firmly bound together.

More specifically an object of this invention is to provide projections which may extend into a bulbous body and additionally serve to mechanically lock the handle and bulbous body together.

With these and other objects in view, the invention consists of certain novel features of construction, as will be more fully described and particularly pointed out in the appended claim.

In proceeding with this invention I so form the injection mold from which a handle for a device is to be taken that the end of the handle which is to engage the enlarged body will conform exactly to the body and be a counterpart thereof regardless of the shape thereof. Additionally in this surface which is engaged I provide openings so that the projections on the handle will extend into these openings that the same may be upset or headed over to lock the handle to the body. The arrangement is such that the body, when hollow, may be formed in two parts and after the handle is attached the parts may be assembled.

Figure 1:
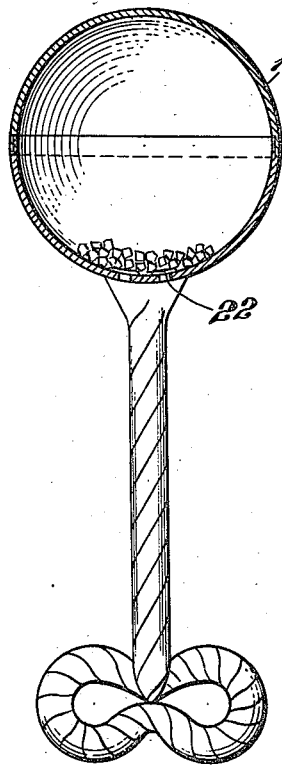
Fig. 1 is an elevation with a bulbous body in section illustrating my invention in the form of a rattle.
Figure 2:
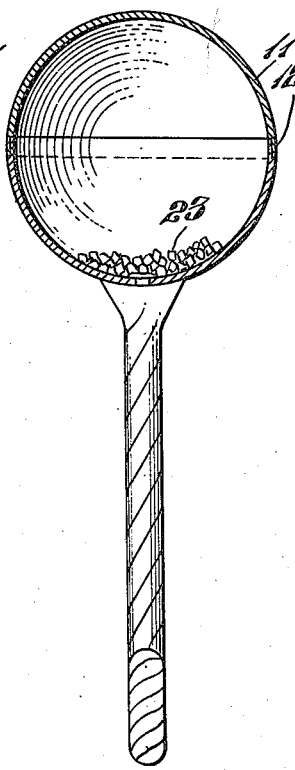
Fig. 2 is a view similar to Fig. 1 but showing the section at right angles thereto.
Figure 3:
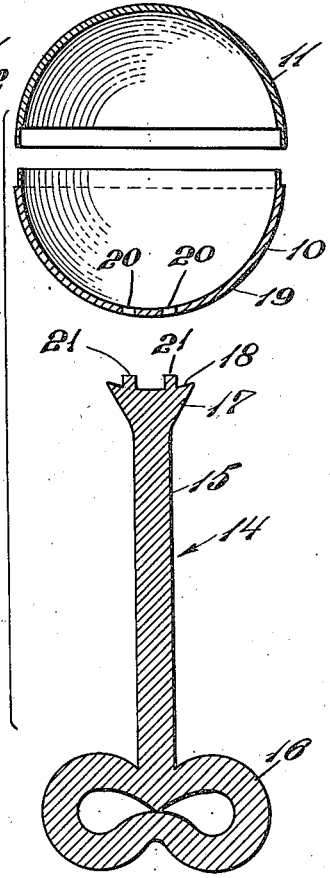
Fig. 3 is an exploded view showing the several parts in separated relation.

With reference to the drawing, 10 designates the lower half and 11 the upper half of a bulbous body the edges of which parts may interfit and overlap as at 12 shown in Figs. 1 and 2.

A handle 14 has a shank 15 with an outer gripping end 16 while at the opposite end of the shank the same is enlarged as at 17 with its end 18 shaped to conform exactly to the outer surface 19 of the bulbous body at the location on the body at which it is to be attached. These surfaces 18 and 19 will engage throughout their extent and may be cemented one to the other by some sort of material which will soften the plastic of which both parts are formed and will, when pressure is applied, weld them together.

The parts 10 and 11 are both formed of some plastic material while likewise the handle 14 is formed of the same sort of plastic material preferably from an injection mold. The plastic material may be any one of several suitable materials similar to Celluloid, acetate, resins of various characters, or any substance which is capable of being molded.

Openings 20 are provided in the portion 10 of the bulbous body for the reception of projections 21 which are formed as an integral part of the handle extending axially thereof and beyond the surface 18 so as to project through the openings 20. These projections 21 serve to prevent twisting and may be headed over as at 22 by enlarging the ends thereof by softening in a solvent with pressure on the ends thereof so that the heads will extend over the inner surface of the portion 10 of the bulbous body.

After the handle is securely attached both mechanically through the projections and by means of softening and cementing the corresponding shaped surfaces one to the other, if the toy is to be a rattle, some material such as 23 may be placed within the bulbous body and the part 10 fitted into the part 11 and there suitably secured in place at the overlapping portions 12 by some cementitious material.

Figure 4:
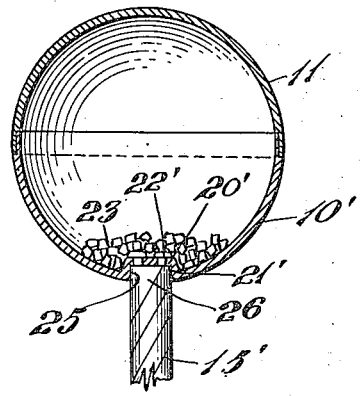
Fig. 4 is a fragmental sectional view of a modified form.

In Fig. 4 the part 10' is recessed as at 25 in a shape to snugly receive the end 26 of the shank 15' and the bottom of the recess is provided with openings 20' to receive projections 21' which may be provided with heads 22' to mechanically lock the handle shank in position. Also cementitious material may secure the contacting surfaces of the end 26 and recess 25 to provide a firm bond.

In this manner the handle is securely provided on the bulbous body and will not be easily detached. A strong rattle is provided by this arrangement.

I claim:

In a toy an enlarged hollow body having a depression in its outer surface provided with a bottom wall, a handle having a shank and an end of a cross section closely fitting that of said depression and with its end against said wall, said shank end and depressed surface engaging throughout an extended area and cemented together, said bottom wall having an opening therein of a size less than said depression, a projection on said handle extending through said opening and headed to prevent withdrawal therefrom.

VIRGINIA D. DESMOND.